US009342068B2

(12) United States Patent
Kaku et al.

(10) Patent No.: US 9,342,068 B2
(45) Date of Patent: May 17, 2016

(54) MOTION CONTROLLER AND MOTOR CONTROL SYSTEM

(71) Applicant: KABUSHIKI KAISHA YASKAWA DENKI, Kitakyushu-shi (JP)

(72) Inventors: Yasuhiko Kaku, Kitakyushu (JP); Haruhiko Koike, Kitakyushu (JP); Tomohiro Kamishio, Kitakyushu (JP); Kanji Watanabe, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/316,722

(22) Filed: Jun. 26, 2014

(65) Prior Publication Data

US 2014/0306643 A1 Oct. 16, 2014

Related U.S. Application Data

(63) Continuation of application No. PCT/JP2011/080526, filed on Dec. 28, 2011.

(51) Int. Cl.
*G05B 19/04* (2006.01)
*G05B 19/409* (2006.01)
*G05B 19/416* (2006.01)

(52) U.S. Cl.
CPC ............ *G05B 19/409* (2013.01); *G05B 19/416* (2013.01); *G05B 2219/42176* (2013.01)

(58) Field of Classification Search
CPC ...... G05B 15/00; G05B 19/18; G06F 13/368; H02P 3/08
USPC ........... 318/5, 560, 561, 568.18, 568.23, 569, 318/600, 625, 677, 685, 696, 35, 53, 55, 68, 318/266, 400.01, 432, 466, 599, 700, 701, 318/727, 799, 568.2, 568.21; 388/800; 700/257, 264, 61; 716/116
See application file for complete search history.

(56) References Cited

U.S. PATENT DOCUMENTS 5,596,251 A * 1/1997 Miller ...................... B26D 1/38
264/148
5,706,627 A * 1/1998 Kirka et al. ....................... 53/52
(Continued)

FOREIGN PATENT DOCUMENTS

JP 01-093803 4/1989
JP 11-202912 7/1999
(Continued)

OTHER PUBLICATIONS

Japanese Office Action for corresponding JP Application No. 2013-551164, Mar. 18, 2014.
International Search Report for corresponding International Application No. PCT/JP2011/080526, Apr. 10, 2012.
(Continued)

*Primary Examiner* — Antony M Paul
(74) *Attorney, Agent, or Firm* — Mori & Ward, LLP

(57) ABSTRACT

A motion controller includes a controller configured to output a motor driving command based on a motion-and-sequence time chart used for motion control of a motor, to a motor driving apparatus. The controller is configured to receive the motion-and-sequence time chart, which has been created by a general-purpose PC, from the general-purpose PC via a higher-layer network. The controller is configured to receive the motion-and-sequence time chart including a command data sequence included in the motor driving command for the motor driving apparatus. The controller is configured to receive the motion-and-sequence time chart including a sequence time chart that describes a coordinated relationship between the motion control of the motor and a certain two-level input/output signal relating to the motion control of the motor.

17 Claims, 15 Drawing Sheets

(56) References Cited

U.S. PATENT DOCUMENTS

| | | | |
|---|---|---|---|
| 7,158,900 B2 * | 1/2007 | McNutt | 702/73 |
| 7,890,212 B2 * | 2/2011 | Cornett et al. | 700/264 |
| 8,082,515 B2 * | 12/2011 | Chandhoke | G06F 8/00 700/117 |
| 2006/0197481 A1 * | 9/2006 | Hotto | E05F 15/668 318/280 |

FOREIGN PATENT DOCUMENTS

| | | |
|---|---|---|
| JP | 2001-286169 | 10/2001 |
| JP | 2005-293569 | 10/2005 |

OTHER PUBLICATIONS

Written Opinion for corresponding International Application No. PCT/JP2011/080526, Apr. 10, 2012.

* cited by examiner

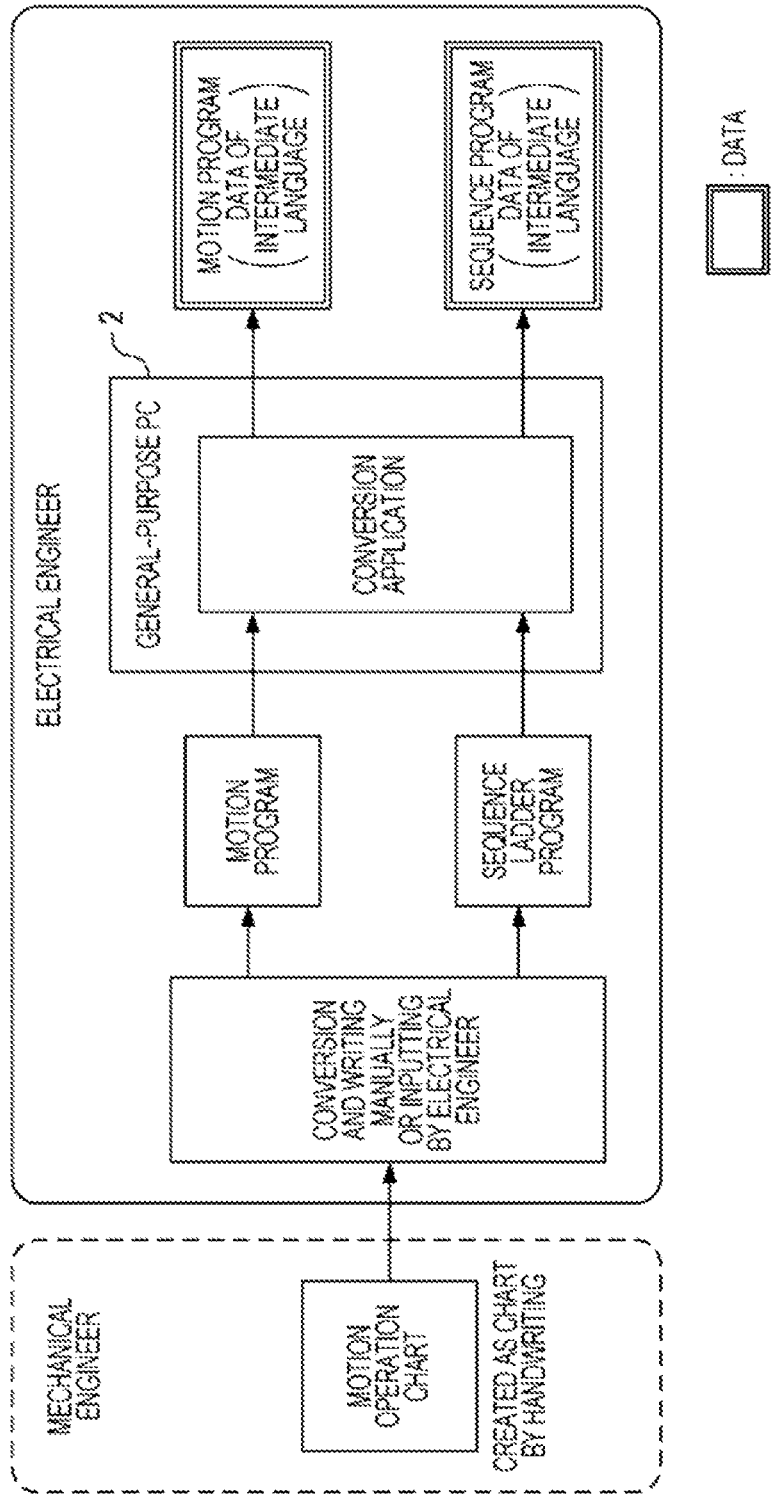

MOTION CONTROLLER AND MOTOR CONTROL SYSTEM

CROSS-REFERENCE TO RELATED APPLICATIONS

The present application is a continuation application of PCT/JP2011/080526, filed Dec. 28, 2011, the contents of which are incorporated herein by reference in its entirety.

BACKGROUND

1. Field of the Invention

The embodiments disclosed herein relate to a motion controller and a motor control system.

2. Description of the Related Art

Japanese Unexamined Patent Application Publication No. 2005-293569 describes a multi-axis control system which includes a programmable logic controller (PLC), a motion controller, and a motor driving apparatus and which serves as a control apparatus for a plurality of motors in factory automation installed in production factories.

SUMMARY

According to an aspect of the present disclosure, a motion controller is employed which includes a controller configured to output a motor driving command based on a motion time chart used for motion control of a motor, to a motor driving apparatus.

According to another aspect of the present disclosure, a motor control system is employed which includes the motion controller described above, at least one motor, and a motor driving apparatus configured to supply the motor with a driving power in accordance with the motor driving command based on the motion time chart used for motion control of the motor.

BRIEF DESCRIPTION OF THE DRAWINGS

FIG. 2 is a diagram illustrating a process of creating a motion program in a comparative example according to the related art.

DESCRIPTION OF THE EMBODIMENTS

During manufacturing of production machinery serving as factory automation including a multi-axis control system, work such as design, assembly, a test operation, and adjustment has been collaboratively performed by or divided among mechanical engineers and electrical engineers because of the following reason, for example. A mechanical section which is the main portion of the production machinery is manufactured by mechanical engineers alone. On the other hand, because work related to a PLC, a motion controller, and a motor driving apparatus which serve as a control system of the mechanical section involves technical skills related to electric and computer fields, such work involves help of electrical engineers in most cases. In particular, as for motion control of motors, the motion controller executes a motion program and a sequence program that is described as a ladder program just like the one for the PLC. For this reason, in many cases, it has been very difficult for mechanical engineers who have not mastered various programming techniques to make settings of motion control by themselves. In the case where work related to motion control of motors which serve as driving sources of the production machinery is collaboratively performed by two parties, i.e., mechanical engineers and electrical engineers, in this way, the work efficiency is very low. In particular, in adjustment work, the two parties alternately and repeatedly investigate which of the mechanical section and the control system has caused a trouble, making the work significantly troublesome.

Inventors who have noticed such a background have performed a research and development of a motion controller and a motor system that allow average mechanical engineers to perform motion-control-related work from design to adjustment by themselves, and have arrived at an embodiment.

An embodiment will be described below with reference to the accompanying drawings.

System Configuration According to Embodiment

Figure 1:
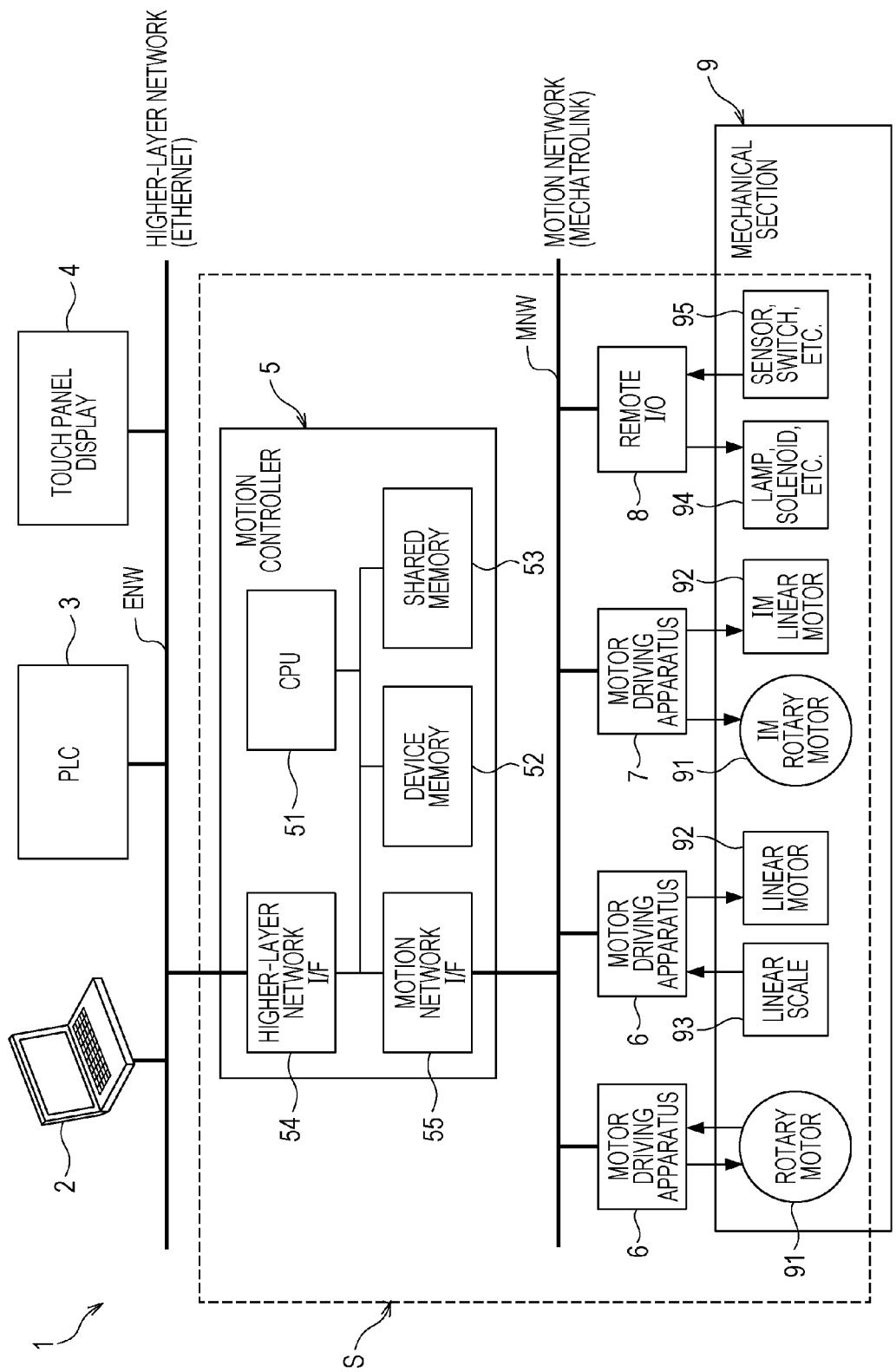
FIG. 1 is a block diagram schematically illustrating the system configuration of production machinery including a motor control system according to an embodiment.

FIG. 1 is a block diagram schematically illustrating the system configuration of production machinery including a motor control system according to an embodiment. In this example illustrated in FIG. 1, production machinery 1 includes a general-purpose personal computer 2 (hereinafter, simply referred to as a general-purpose PC 2), a programmable logic controller (PLC) 3, a touch panel display 4, a motion controller 5, motor driving apparatuses 6, a motor driving apparatus 7, a remote input/output (I/O) 8, and a mechanical section 9.

The general-purpose PC 2 is a personal computer configured to run an application program on a general-purpose operating system (OS) so as to perform a certain process. Note that, in this embodiment, an engineering tool including a set of applications used to perform various settings, a test operation, and adjustment of a motor control system S of the production machinery 1 is pre-installed in this general-purpose PC 2. This general-purpose PC 2 is used to perform settings, a test operation, and adjustment of the motor control system S through the engineering tool, and thus is removed when the production machinery 1 is actually put into operation.

The PLC 3 is a control device configured to perform sequence control on the entire production machinery 1 through a process based on a sequence program (described later). Note that, although not particularly illustrated in FIG. 1, this PLC 3 includes a central processing unit (CPU) and a storage unit such as a memory therein, and is a computer that stores and executes a sequence program (described later) and that is specialized for sequence control of the production machinery 1.

The touch panel display 4 is an operation unit configured to display various pieces of information output from the PLC 3 and configured to receive operation information input from the user. The touch panel display 4 functions, in place of the general-purpose PC 2, as a human interface for the user during the actual operation of the production machinery 1.

The motion controller 5 is a control device configured to perform motion control on motors via the motor driving apparatuses 6 and 7 in cooperation with the remote I/O 8 that performs two-level I/O control, in accordance with a motion-and-sequence timing chart (described later). In the illustrated example according to this embodiment, this motion controller 5 includes a CPU 51, a device memory 52, a shared memory 53, a higher-layer network interface (I/F) 54, and a motion network I/F 55. The device memory 52 is a memory configured to hold and store programs and data exclusively used by the motion controller 5. The shared memory 53 is a memory which shares part of stored content with a shared memory (not particularly illustrated) included in the PLC 3. In the example according to this embodiment, the higher-layer network I/F 54 and the motion network I/F 55 are interfaces that support a network ENW based on Ethernet (registered trademark) and a network MNW based on MECHATROLINK (registered trademark) so as to control transmission and reception of information, respectively. The networks ENW and MNW will be described later. Note that a network such as the one based on EtherCAT (registered trademark) may be used as the motion network MNW in addition to the one based on MECHATROLINK (registered trademark).

The motor driving apparatuses 6 and 7 are control devices each configured to supply a corresponding motor included in the mechanical section 9 with a driving power in accordance with a motor driving command received from the motion controller 5 so as to control driving of the motor.

The remote I/O 8 is a control device configured to perform two-level I/O control on an input device and an output device included in the mechanical section 9. Specifically, this remote I/O 8 outputs two-level input information (i.e., ON or OFF) of a sensor or switch included in the mechanical section 9, to the PLC 3 and the motion controller 5 via the higher-layer network ENW and/or the motion network MNW. The remote I/O 8 also switches a two-level output state of a lamp or valve-opening/closing solenoid included in the mechanical section 9 between ON and OFF, in accordance with a command received from the PLC 3 and the motion controller 5 similarly via the higher-layer network ENW and/or the motion network MNW.

The mechanical section 9 is a main section of the production machinery 1. The mechanical section 9 includes various motors (such as (IM) rotary motors 91 and (IM) linear motors 92 in FIG. 1) serving as driving sources therefor, a detector (such as a linear scale 93 in FIG. 1) therefor, a two-level input device 95 (such as a sensor or switch in FIG. 1), and a two-level output device 94 (such as a lamp or solenoid in FIG. 1). This mechanical section 9 includes a combination of a plurality of drive shafts configured to move a workpiece or tool (not particularly illustrated), and motion operation of each shaft is important in the mechanical section 9. Each shaft has, for example, a rotation unit including a rotary motor and a gear, or a linear motion unit including a linear motor or a combination of a rotary motor and a ball screw.

In the illustrated example according to this embodiment, the general-purpose PC 2, the PLC 3, the touch panel display 4, and the motion controller 5 are connected to one another via the higher-layer network ENW based on Ethernet (registered trademark) so as to be able to transmit and receive information. Also, in the example according to this embodiment, the motion controller 5, the motor driving apparatuses 6 and 7, and the remote I/O 8 are connected to one another via the motion network MNW based on MECHATROLINK (registered trademark) so as to be able to transmit and receive information. Ethernet (registered trademark) and MECHATROLINK (registered trademark) are used as specific standards for the higher-layer network ENW and the motion network MNW, respectively, in the example according to this embodiment; however, the higher-layer network ENW and the motion network MNW may be configured using standards other than these standards. In addition, the motion controller 5 may be connected to the general-purpose PC 2 or the like via Universal Serial Bus (USB) just for the purpose of power supply.

In this embodiment, the term "sequence control" refers to collectively controlling coordination between many pieces of two-level input information and a two-level output state in the production machinery 1 in accordance with a preset coordinated relationship. Almost all pieces of information handled are information having two levels (i.e., ON and OFF).

Also, the term "motion control" typically refers to causing the plurality of motors 91 and 92 to individually perform quantitative operations in parallel and in coordination with each other, and corresponds to control such as so-called locus control or interpolation control. Because this motion control also includes coordination with the sequence control, two-level information described above as well as quantitative information such as the position, velocity, or torque/thrust for rotational or linear movement are handled.

The motor control system S at least includes the motion controller 5, the motor driving apparatuses 6 and 7, and the motors 91 and 92.

Comparative Example of Motion-Control-Related Part According to Related Art

Now, a comparative example of manufacturing of motion-control-related part that has been performed in the related art will be described. FIG. 2 is a diagram illustrating a process of creating a motion program in this comparative example according to the related art.

Figure 9:
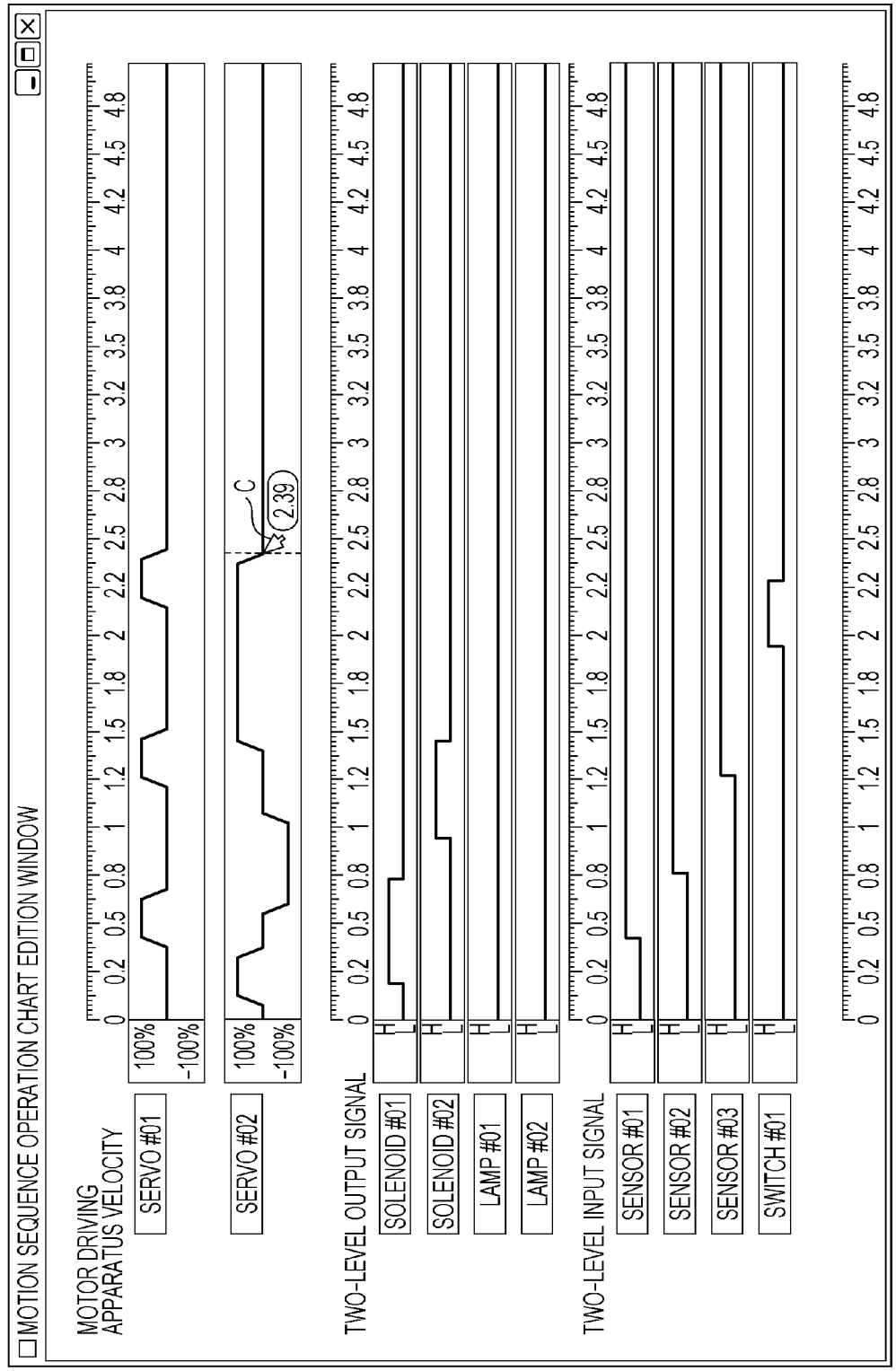
FIG. 9 is a diagram illustrating a display example of an edition window displayed when an operation chart conversion tool is executed.

In the comparative example according to the related art illustrated in FIG. 2, first, a motion operation chart is created by handwriting it on paper as a drawing, using graphic software on the general-purpose PC 2, or the like. This motion operation chart is, for example, a chart in which operations of the plurality of motors 91 and 92 (the motor driving apparatuses 6) each assigned a corresponding axis number are described chronologically and geometrically as illustrated in FIG. 9, and further a coordinated relationship with two-level I/O control performed by the remote I/O 8 is described.

Only mechanical engineers who have designed the mechanical section 9 of the production machinery 1 and have considered motion operations at individual axes can create this motion operation chart. In order to realize coordinated operation between portions that move objects such as workpieces and tools included in the mechanical section 9, mechanical engineers set and define, using the motion operation chart, a coordinated relationship between quantitative coordinated driving that is performed in parallel at individual axes and two-level I/O control for a sensor, a limit switch, a lamp, a solenoid, and so on.

Then, based on the content written in this motion operation chart, electrical engineers create a motion program and a sequence ladder program. Here, a description is given only of motion control performed by the motion controller 5; however, complicated motion involves sequential operation as well as motion operation with respect to the axes. Thus, two programs (i.e., the motion program and the sequence ladder program) are ultimately used.

Figure 3A:
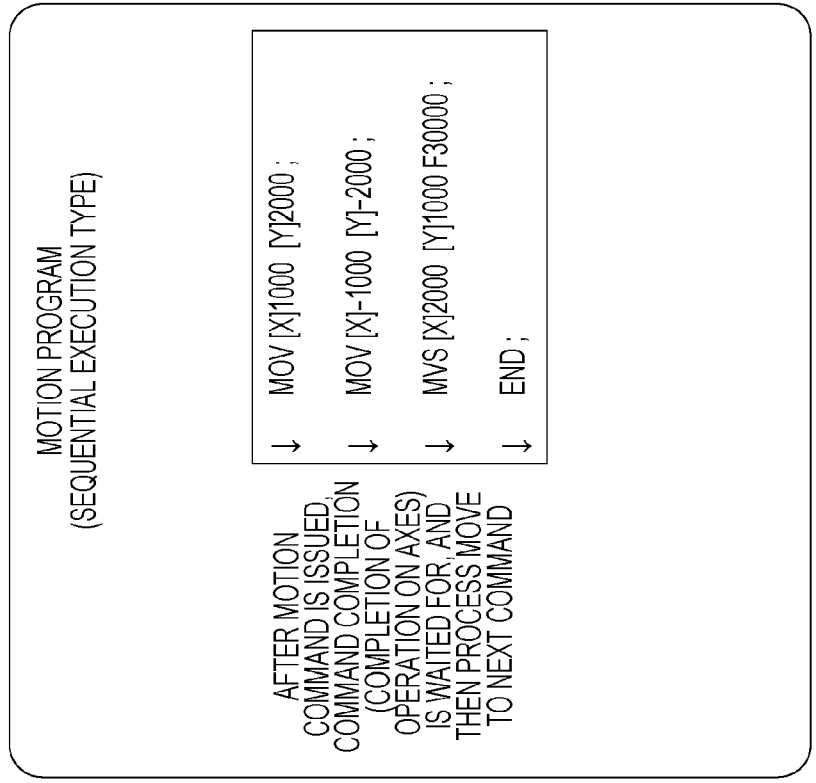
FIGS. 3A and 3B are diagrams explaining a sequence ladder program and the motion program, respectively.

A sequence ladder program is a program that is stored in and executed by the motion controller 5 according to the related art and describes a procedure of sequence control. Hitherto, sequence control has been typically performed in accordance with a ladder program. A ladder program is a program having a format based on a relay control method that has been performed before development and utilization of computer-based control using the CPU. For example, as illustrated in FIG. 3A, a ladder program is a type of program in which a plurality of program lines that geometrically describe a coordinated relationship among one or more two-level inputs represented by relays configured to switch between connection and disconnection and one two-level output in parallel, and the plurality of program lines are collectively executed.

Figure 3B:
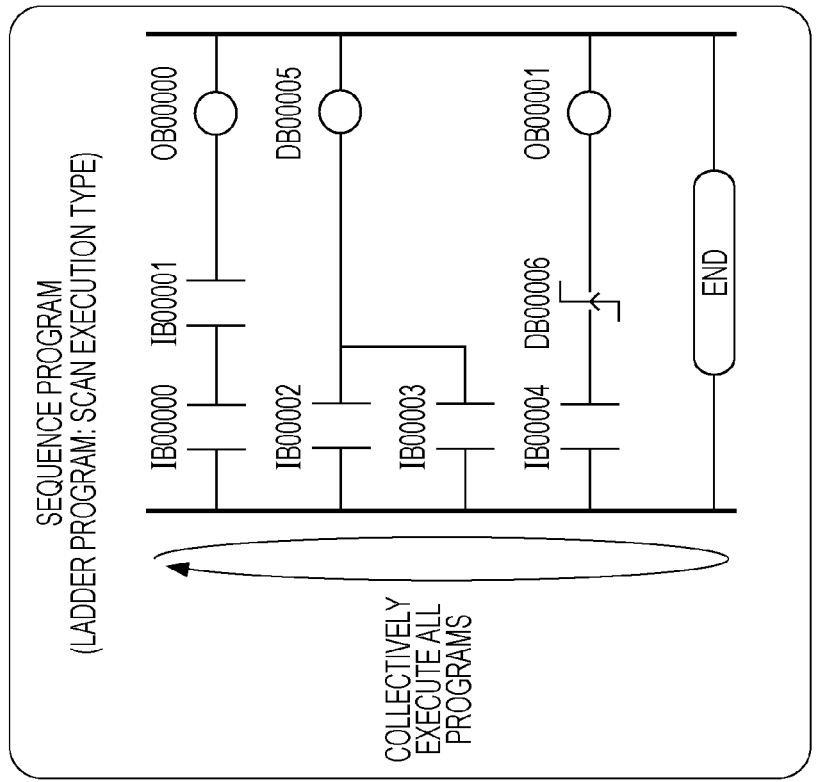

In contrast, a motion program is a program that is stored in and executed by the motion controller 5 according to the related art and that describes a procedure of motion control. For example, as illustrated in FIG. 3B, a motion program used in the related art is a type of program in which program lines that describe movement distances at individual axes by using character strings are written in an execution order and are sequentially executed in the execution order.

In order to create these motion program and sequence ladder program, a computer-related programming technique (so-called coding technique) is used. Accordingly, in the related art, mechanical engineers who have not mastered the programming technique are unable to create the programs in general, and thus the motion program and the sequence ladder program are created mainly by electrical engineers alone by converting the content of the motion operation chart. These two programs are created by performing input using an edition application that runs on the general-purpose PC 2 as well as by handwriting the programs on paper.

Then, as illustrated in FIG. 2, these motion program and sequence ladder program are input to a certain conversion application that runs on the general-purpose PC 2. In this way, the motion program and sequence program in a form of intermediate language data executable by the motion controller 5 are created.

As described above, the motion program and the sequence ladder program have different execution formats. Specifically, the sequence ladder program is of a scan execution type in which all program lines are collectively executed within one control scan. In contrast, the motion program is of a sequential execution type in which one program line is executed over multiple scans, and thus another processing is not to be performed while one program line is being executed. Complicated motion operation of the production machinery 1 is not implemented unless two programs of completely different types are written for motion control alone. Because it is not easy even for electrical engineers to correctly use two programs of different types in this way, it is a very rare case where a mechanical engineer has mastered the two programs.

Figure 4:
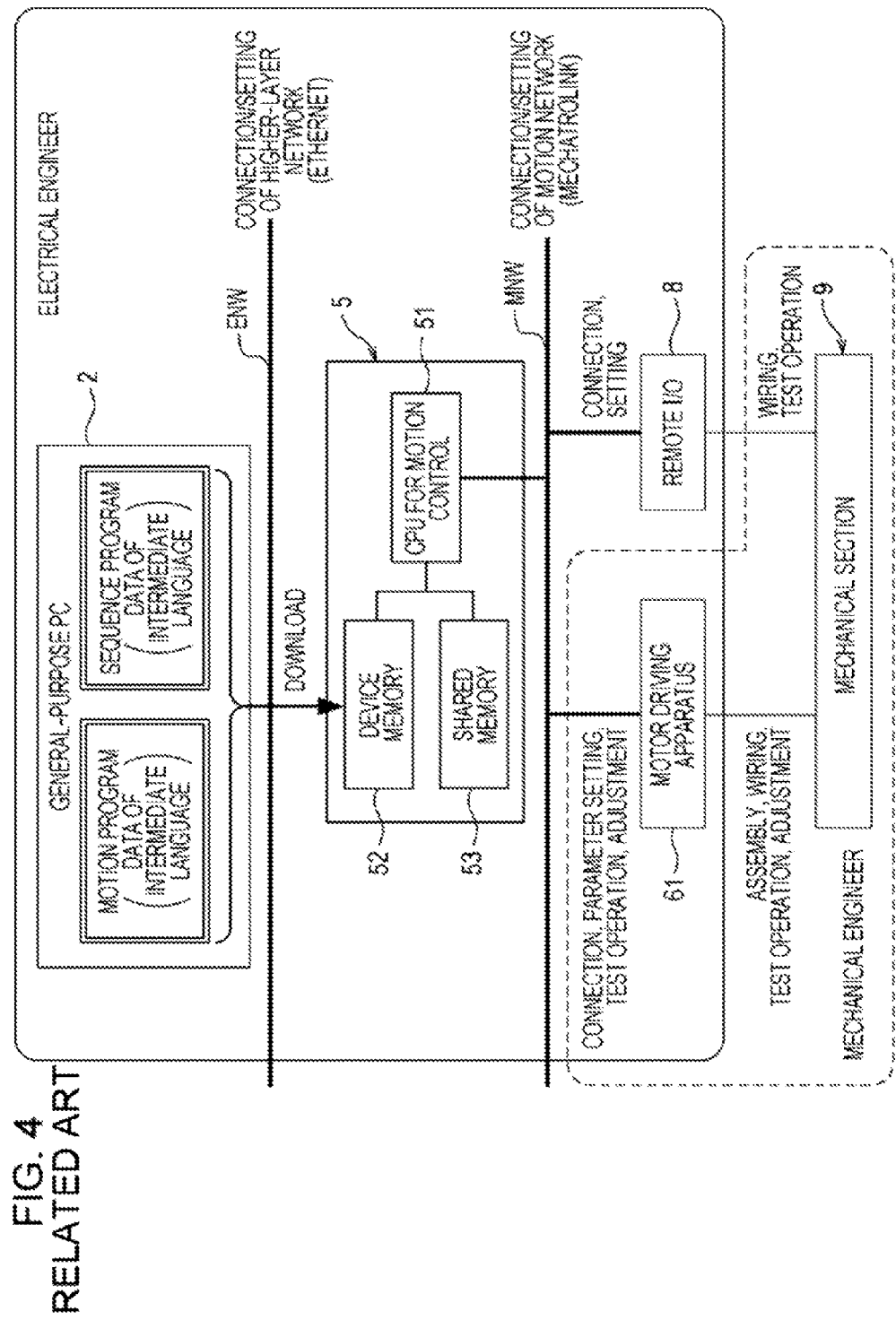
FIG. 4 is a diagram illustrating a comparative example of hardware setup of the motor control system that has been performed in the related art in relation to motion control.

FIG. 4 is a diagram illustrating a comparative example of hardware setup of the motor control system S that has been performed similarly in the related art in relation to motion control. Note that the case of using the same hardware configuration as that illustrated in FIG. 1 is assumed, and illustration of portions not related to setup of the motion system is appropriately omitted in FIG. 4.

The hardware setup of the motor control system S illustrated in FIG. 4 is based on the assumption that the mechanical section 9 of the production machinery 1 has already been assembled and individual drive shafts and their corresponding motor driving apparatuses 61 have already been installed. The general-purpose PC 2 and the motion controller 5 are connected to each other via the higher-layer network ENW based on Ethernet (registered trademark), and network settings are appropriately set so as to enable transmission and reception of information. In addition, the motion controller 5, the motor driving apparatuses 61, and the remote I/O 8 are connected to one another via the motion network MNW based on MECHATROLINK (registered trademark), and network settings are appropriately set so as to enable transmission and reception of information. Further, the motor driving apparatuses 61 and their corresponding motors 91 and 92 are wired and connected, and the remote I/O 8 and the two-level input device 95 or the two-level output device 94 are wired and connected.

Subsequently, the user performs settings such as setting of various parameters of the motor driving apparatuses 61 and assignment of I/O ports of the remote I/O 8 by using an engineering tool (not illustrated in FIG. 4) which takes a form of an application that runs on the general-purpose PC 2. Thereafter, a test operation of the motor driving apparatuses 61 and the motors 91 and 92 included in the mechanical section 9 becomes possible. Note that, during a test operation performed at this point, it is checked whether or not the motors 91 and 92 operate.

Then, the motion program and sequence ladder program created in the general-purpose PC 2 are downloaded to the device memory 52 of the motion controller 5 via Ethernet (registered trademark). By causing the motion controller 5 to execute the motion program and the sequence ladder program, a test operation of part related to motion control becomes possible. In many cases, the individual programs and various parameters are repeatedly adjusted so that motion control is to be performed appropriately at a high precision. Through the above-described process, the hardware of the motor control system S is set.

In such a motor control system S of the comparative example according to the related art, only work for assembly, wiring, a test operation, and adjustment (test operation and adjustment of a mechanical part) of the mechanical section 9 can be performed by mechanical engineers alone in the hardware setup. However, the other work involves the knowledge and skill related to electric and computer fields, and thus is shared with electrical engineers. Among such work, work for setting and adjusting parameters of the motor driving apparatuses 61 is to be collaboratively performed by mechanical engineers and electrical engineers.

Figure 5:
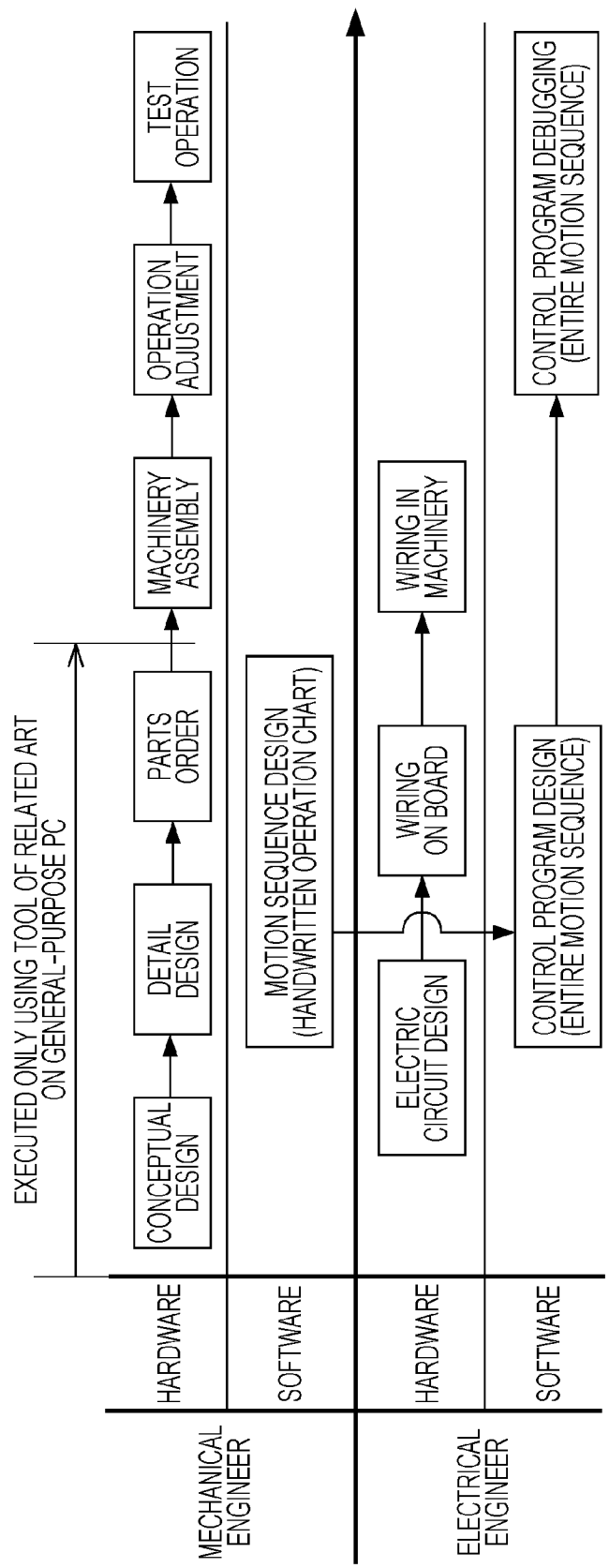
FIG. 5 is a diagram that chronologically summarizes a work process related to motion control performed in the comparative example according to the related art, with distinction between work performed by mechanical engineers and work performed by electrical engineers.

The above-described work process related to motion control in the comparative example according to the related art is chronologically summarized as illustrated in FIG. 5 with distinction between work performed by mechanical engineers and work performed by electrical engineers. In terms of the hardware aspect, mechanical engineers perform conceptual design of the entire production machinery 1 first, then perform detail design of each part, and then place an order of components to be used, as their work. Work up to this point is mainly performed only using a tool application of the related art, such as computer aided design (CAD), which runs on the general-purpose PC 2. Thereafter, assembly of the entire production machinery 1 including the motor control system S is performed using obtained components, and operation adjustment and a test operation of the individual components are performed including setting of various parameters. In addition, in terms of software aspect of the motor control system S, mechanical engineers design motion control and sequence control by creating the above-described motion operation chart by handwriting it or the like. This step is performed in parallel to detail design of hardware or placement of an order of components.

On the other hand, in terms of the hardware aspect, electrical engineers design an electric circuit diagram in accordance with the conceptual design created by the mechanical engineers, and perform wiring of individual components of the motor control system S on a board from the designed electric circuit diagram, as their work. Then, in parallel to assembly of the production machinery 1, electrical engineers perform wiring for connecting the individual components in the production machinery 1. In terms of the software aspect, electrical engineers design various control programs including the motion program and the sequence ladder program on the basis of the motion operation chart created by the mechanical engineers, and create programs of a form of intermediate language data by using a conversion application of the general-purpose PC 2. During the operation adjustment and test operation of the production machinery 1, electrical engineers download the control programs to the motion controller 5 or the like so as to perform the operation adjustment and test operation of motion control.

As described above, within the range related to motion control alone, work performed by mechanical engineers and work performed by the electrical engineers are correlated complicatedly in the manufacturing process of the production machinery 1 in the comparative example according to the related art. In particular, during adjustment work related to motion control, adjustment of motion control in which individual axes are coordinated complicatedly is to be performed after adjustment of each axis has been individually completed. Also, in debugging work performed in the case where the mechanical section 9 does not operate expectedly, debugging of the mechanical section 9 is performed by mechanical engineers alone, whereas debugging of the control programs is performed by electrical engineers alone. Such debugging is collaborative work which includes part unfamiliar to mechanical engineers and part unfamiliar to electrical engineers, and thus is a reason of a long work time. In addition to motion control, electrical engineers have their main work related to the electrical system, such as design of sequence control of the entire production machinery 1 performed by the PLC 3 and design of interface windows displayed on the touch panel display 4. Accordingly, there is a constraint that makes it difficult for the electrical engineers to take time for debugging of motion control. The reasons described above make it very difficult to shorten the development period of the production machinery 1 including the motor control system S of the comparative example according to the related art.

In order to address this issue fundamentally, it is effective to reconsider the motion controller 5. That is, it is desirable to allow average mechanical engineers to perform work from design to adjustment and debugging of the motion related part of the motor control system S in terms of both the hardware aspect and the software aspect by themselves.

Motion Control Related Part in Accordance with Embodiment

Figure 6:
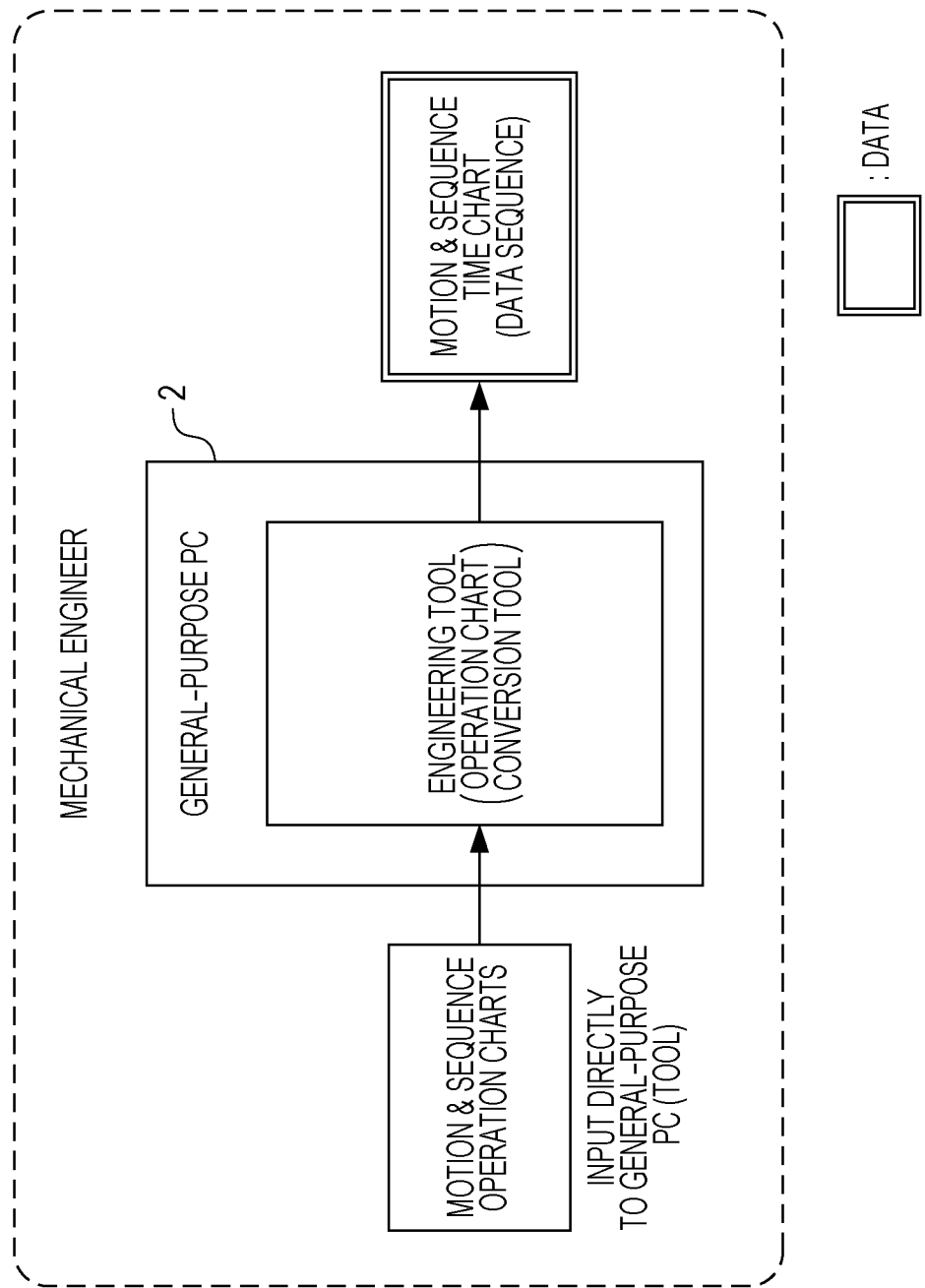
FIG. 6 is a diagram illustrating a process of creating a motion program in accordance with the embodiment.

Accordingly, in this embodiment, part related to motion control is manufactured in a manner described below. FIG. 6 is a diagram illustrating a process of creating a motion program in accordance with this embodiment and corresponding to FIG. 2 of the comparative example according to the related art.

In this example according to this embodiment illustrated in FIG. 6, first, mechanical engineers directly operate an operation chart conversion tool that runs on the general-purpose PC 2 so as to input and create a motion-and-sequence operation chart. This operation chart conversion tool is one of applications included in an engineering tool prepared for motion control of the motor control system S in this embodiment. The operation chart conversion tool automatically and directly creates a motion-and-sequence time chart on the basis of the input and created motion-and-sequence operation chart (see FIG. 9 described later). Unlike the above-described comparative example according to the related art in which the motion program and the sequence program are created in a form of intermediate language data, this motion-and-sequence time chart is created by adding a position data sequence to an alignment command by using an alignment function of the motor driving apparatuses 6. The motion controller 5 can implement motion control including sequence control related to the motion control just by executing this motion-and-sequence time chart.

Figure 7:
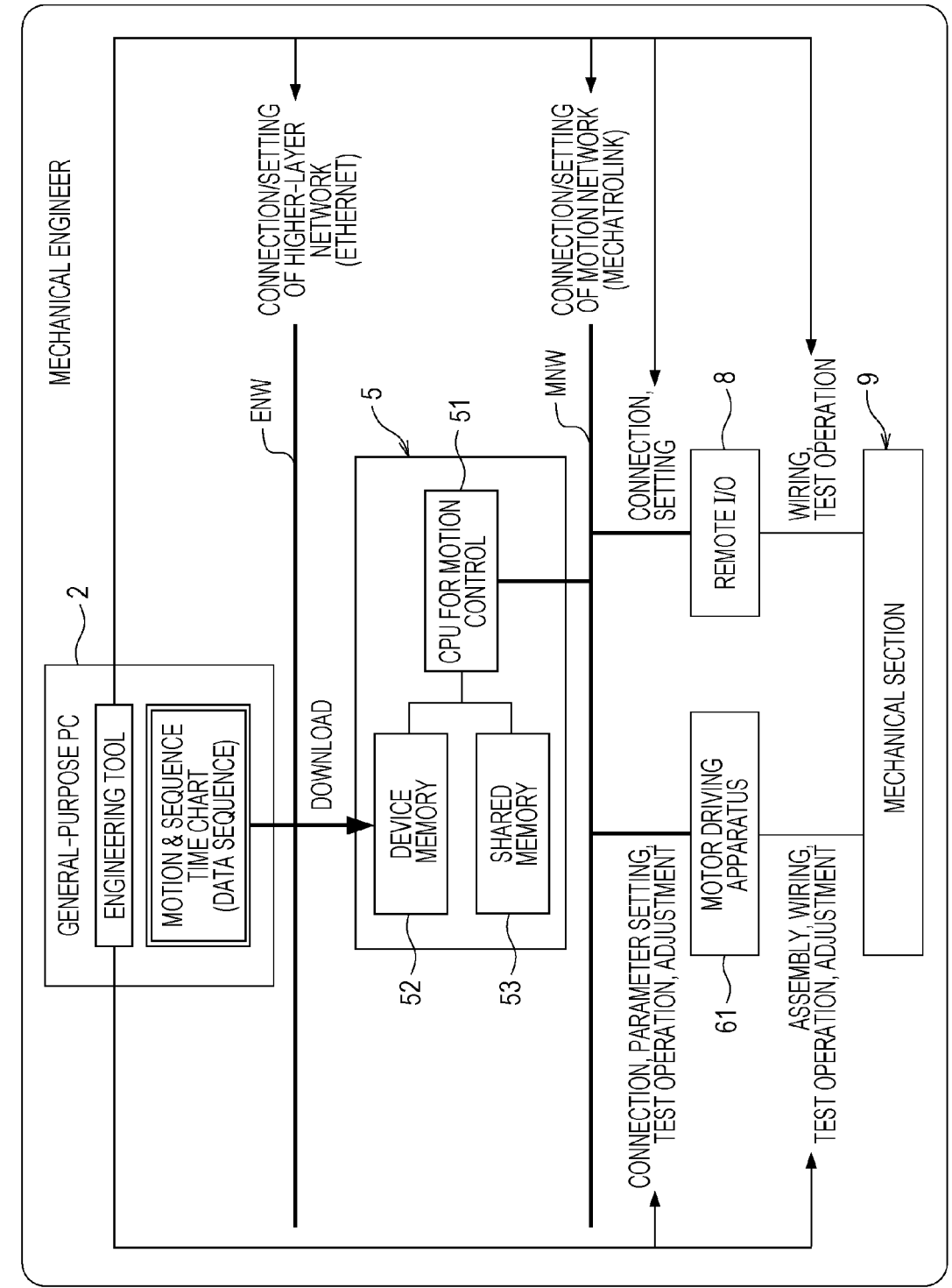
FIG. 7 is a diagram illustrating hardware setup of the motor control system performed in accordance with the embodiment in relation to motion control.

FIG. 7 is a diagram illustrating hardware setup of the motor control system S that is performed in accordance with this embodiment in relation to motion control, and corresponding to FIG. 4 of the comparative example according to the related art. In FIG. 7, by just performing a certain selection operation and a geometrical figure input operation using a corresponding application included in the engineering tool that runs on the general-purpose PC 2, mechanical engineers can perform network settings of the higher-layer network ENW based on Ethernet (registered trademark) and the motion network MNW based on MECHATROLINK; parameter setting, a test operation, and adjustment of the motor driving apparatus 61; setting for I/O port assignment of the remote I/O 8; and a test operation and adjustment of the motors 91 and 92 included in the mechanical section 9. Inputting of numerical values for various parameters may be additionally permitted so as to enable highly precise adjustment.

By causing the motion controller 5 to download the above-described motion-and-sequence time chart to the device memory 52 thereof and to execute the motion-and-sequence time chart, mechanical engineers can perform a test operation and adjustment of motion control which is performed as a result of coordination of axes in the mechanical section 9. That is, this embodiment allows average mechanical engineers to perform work from design to adjustment of the motion-related part in terms of both the hardware aspect and the software aspect of the motor control system S by themselves. In particular, mechanical engineers can debug the control program easily because all they have to do is to appropriate edit the motion-and-sequence operation chart using the above-described operation chart conversion tool, re-create the motion-and-sequence time chart, and re-download the motion-and-sequence time chart to the motion controller 5.

Also, all the motion controller 5 according to this embodiment has to do is to repeatedly output the position data sequence included in the motion-and-sequence time chart as an alignment command to the corresponding motor driving apparatus 6 during motion control. In this way, the motor driving apparatus 6 that repeatedly receives the position data can keep performing a certain motion operation by means of its alignment function. Accordingly, compared with the comparative example according to the related art in which the motion program and the sequence ladder program which are of different types are interpreted and processed from the form of intermediate language data, a processing load of the CPU 51 of the motion controller 5 according to this embodiment is reduced by a large amount.

Figure 8:
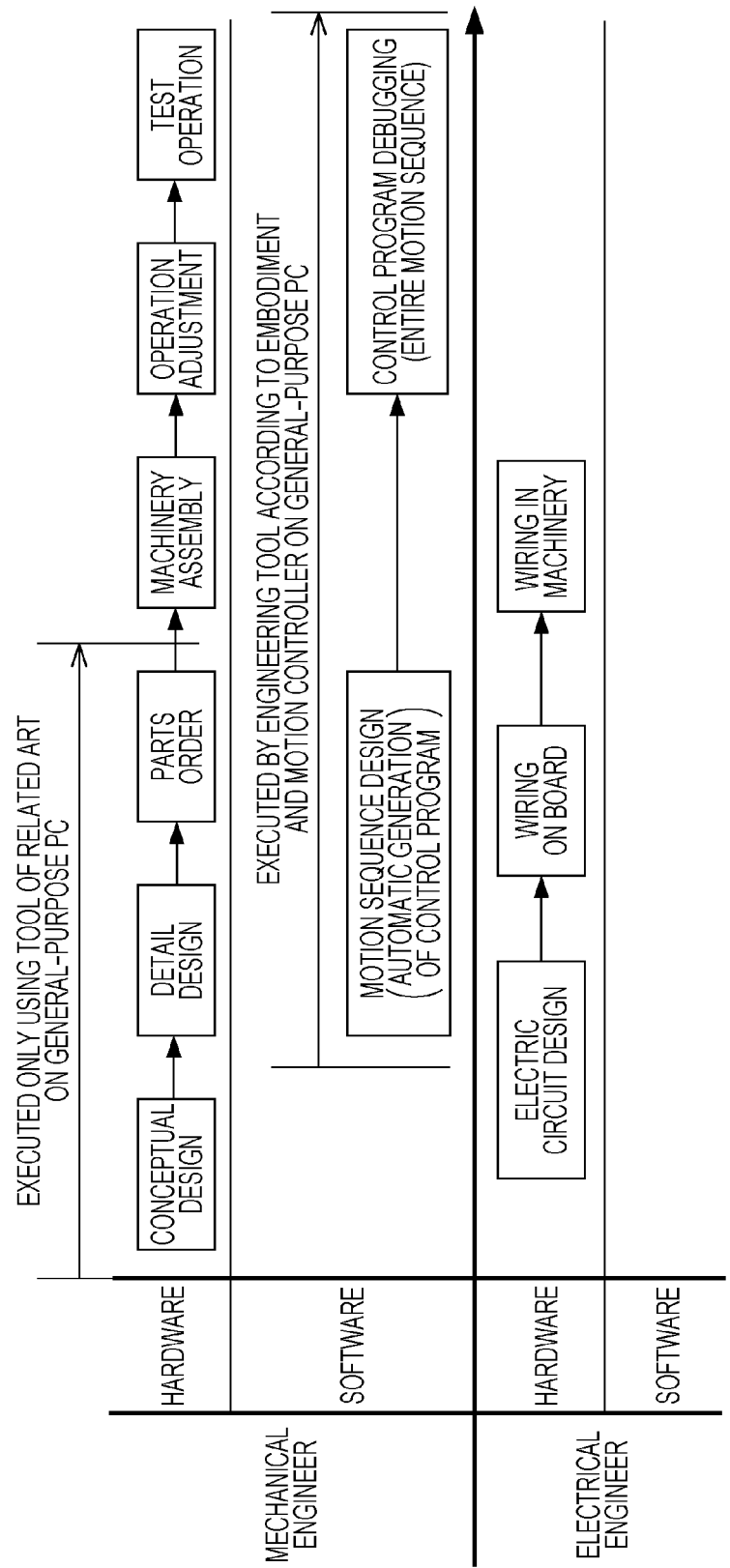
FIG. 8 is a diagram that chronologically summarizes a work process related to motion control performed in the embodiment, with distinction between work performed by mechanical engineers and work performed by electrical engineers.

The work process related to motion control in accordance with this embodiment described above is chronologically summarized, with distinction between work performed by mechanical engineers and work performed by electrical engineers as illustrated in FIG. 8 which corresponds to FIG. 5 described above. That is, this embodiment allows average mechanical engineers to perform work from design to adjustment by themselves in terms of both the hardware aspect and the software aspect within the range related to motion control. In addition, electrical engineers no longer have to perform work in terms of the software aspect within the range related to motion control and just perform design and wiring of the related electrical circuit, and thus can focus on work for sequence control performed by the PLC 3 and for setting interfaces of the touch panel display 4.

Example of Engineering Tool

Functions of individual applications included in the above-described engineering tool will be described below with reference to display examples of execution windows. Note that each execution window illustrated below is displayed using a graphical user interface (GUI) of a so-called multi-window format.

FIG. 9 is a diagram illustrating a display example of an edition window displayed when the above-described operation chart conversion tool is executed. In this example illustrated in FIG. 9, a coordinated relationship among changes in velocity of two motor driving apparatuses 6, which are illustrated as SERVO #01 and SERVO #02; four two-level output signals; and four two-level input signals is set chronologically and geometrically. In this example, at a motor driving apparatus velocity field, a rotation velocity of each motor 91 associated with the corresponding motor driving apparatus 6 can be discretely set in three steps of 0%, 100%, and −100%; and can be switched between the steps at a given timing. A line along the time-axis direction (to the right in the horizontal direction in FIG. 9) can be deformed into an upward or downward trapezoid-like shape by moving a cursor C to a given position on the line for the corresponding motor driving apparatus 6 and then performing a certain operation on the window. The line is initially positioned at a height corresponding to a servo velocity of 0%. By deforming the line into an upward or downward trapezoid-like shape, a timing at which the servo velocity is to be switched to 100% which corresponds to an upward trapezoid-like shape or −100% which corresponds to a downward trapezoid-like shape can be specified. Also, the length of each trapezoid-like shape along the time-axis direction can be changed. Note that settings of the motor driving apparatus 6 may be set using a rotation amount (rotation position) or torque as well as the rotation velocity of the corresponding motor 91. A configuration may be made so that the rotation amount (rotation position) or torque changes discretely in a given number of steps, for example, 0%, 50%, 100%, −50%, and −100%, as well as in three steps of 0%, 100%, and −100% as described above. Alternatively, a configuration may be made so that the rotation amount (rotation position) or torque changes continuously by a given amount.

In this embodiment, the time axis is set as an operation schedule time. The term "operation schedule time" refers to an elapsed period from when motion control is actually started in the production machinery 1, and the progress is chronologically managed by the operation chart conversion tool. The switching schedules for the servo velocities, the two-level output signals, and the two-level input signals are managed in accordance with the same operation schedule. If this operation schedule is stopped because of a failure during motion control, the progress of the switching schedules for the servo velocities, the two-level output signals, and the two-level input signals are also stopped in accordance with the operation schedule time.

Also, lines along the same time-axis direction can be deformed so that the two-level output signals and the two-level input signals are each discretely switched between heights corresponding to two levels (i.e., high (ON) and low (OFF)) at given positions. Further, a timing at which a signal is switched between two levels can be coordinated with a timing at which the servo velocity is switched. That is, a switching timing of one of the signal level and the servo velocity can be set as a trigger for a switching timing of the other of the signal level and the servo velocity.

By geometrically inputting the switching schedules of the servo velocities, the two-level output signals, and the two-level input signals in the above-described manner, the user can easily input the motion-and-sequence operation chart into the operation chart conversion tool. The operation chart conversion tool then creates a motion-and-sequence time chart corresponding to this motion-and-sequence operation chart.

Figure 10:
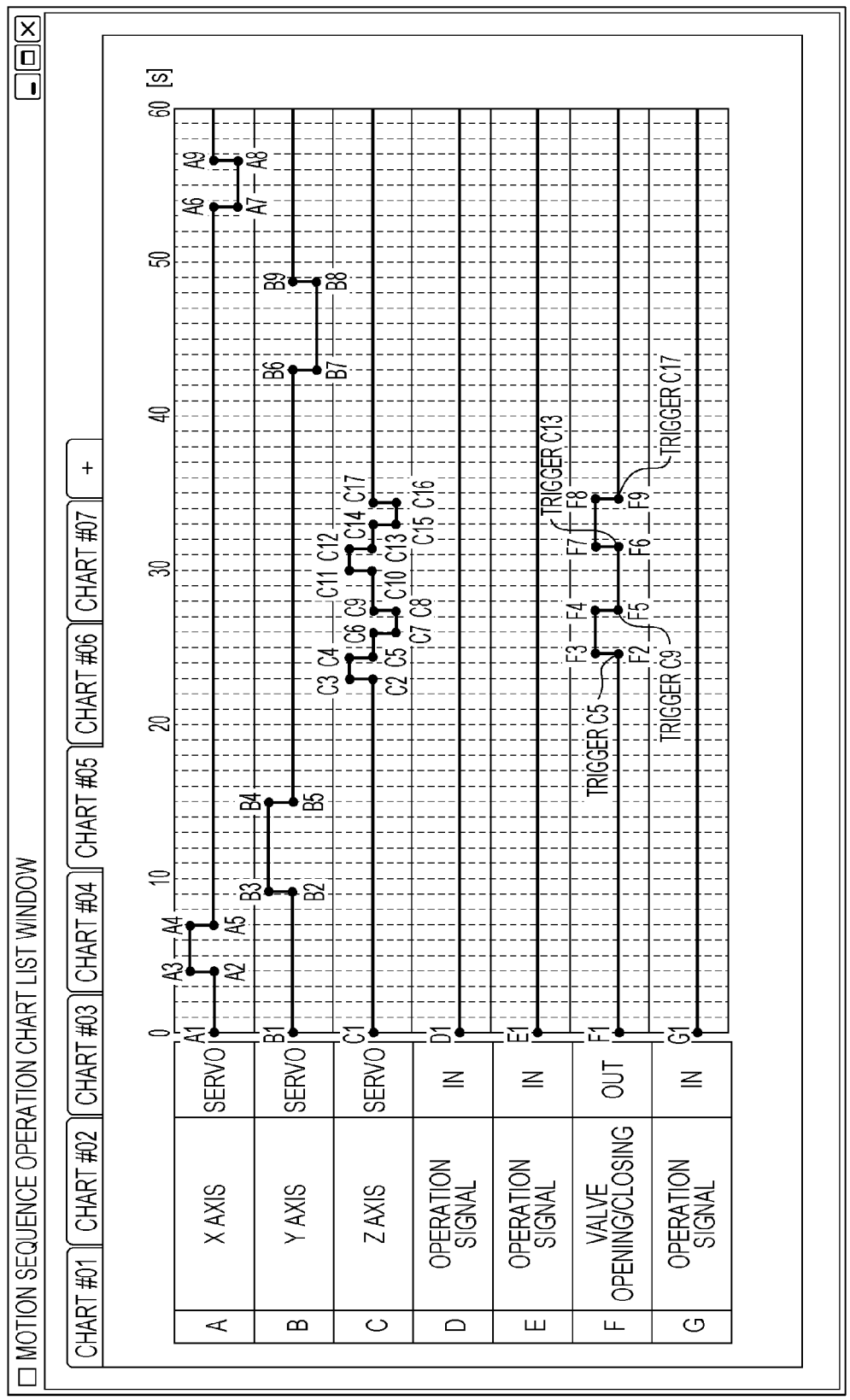
FIG. 10 is a diagram illustrating a display example of a window that manages and lists a plurality of motion-and-sequence operation charts.

The operation chart conversion tool according to this embodiment enables management and listing of a plurality of motion-and-sequence operation charts as illustrated in FIG. 10. In this example illustrated in FIG. 10, seven motion-and-sequence operation charts (CHARTS #01 to #07) have already been input and stored. Among these charts, the motion-and-sequence operation chart (CHART #05) is displayed as result of a tab operation. Note that, in this chart display format, details of the operation chart are simplified when being displayed.

Figure 11:
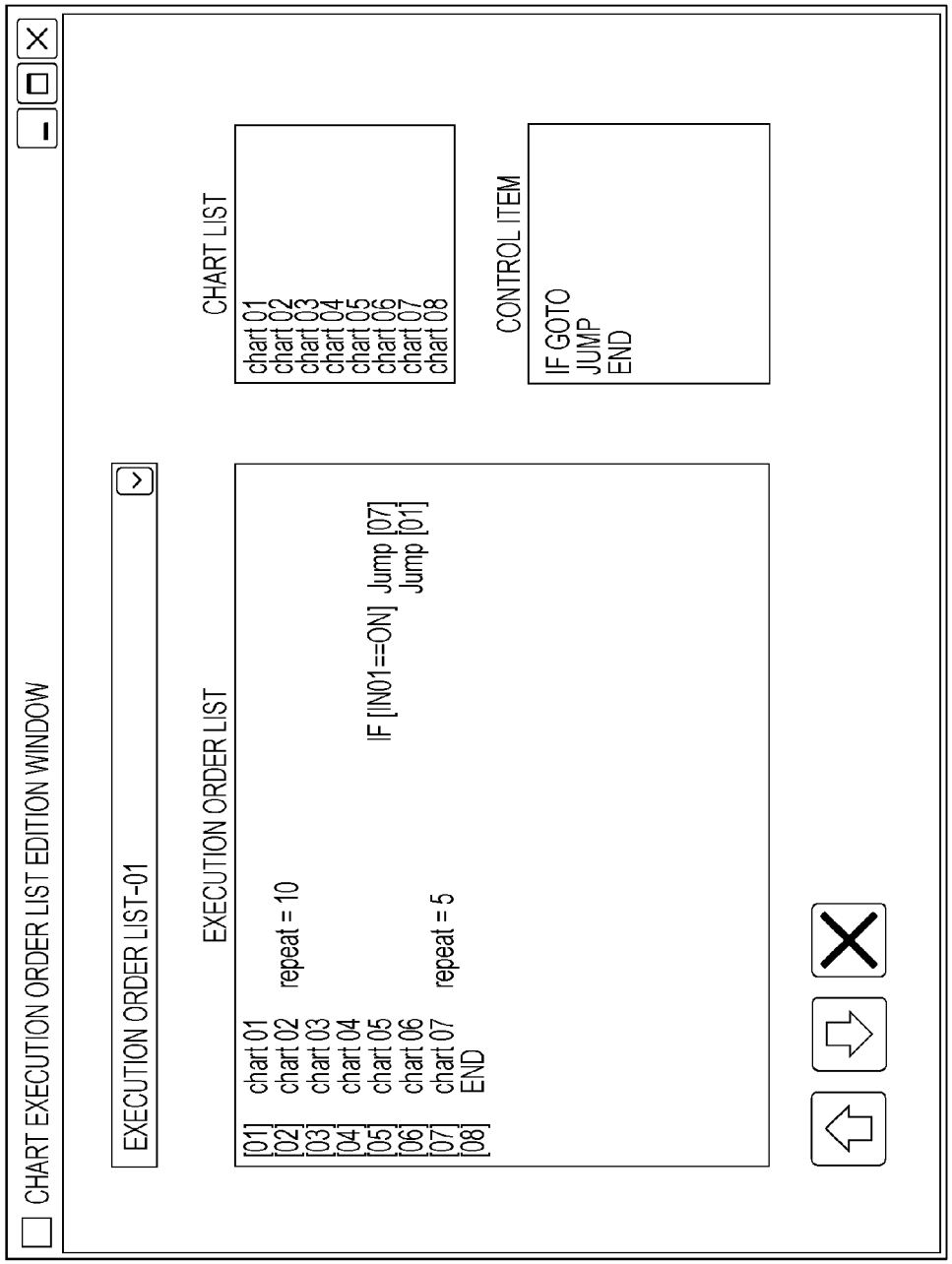
FIG. 11 is a diagram illustrating a display example of an execution-order-list edition window.

Further, the operation chart conversion tool according to this embodiment enables edition of an execution order, the number of repetitions, and a conditional branch on a chart-by-chart basis as illustrated in FIG. 11. In the example illustrated in FIG. 11, a state in which one execution order list named "EXECUTION ORDER LIST-01" is being edited is displayed. According to the example of this "EXECUTION ORDER LIST-01", Charts #01 to #07 are executed in ascending order of execution numbers of [01] to [07] (END for [08] indicates termination). Among Charts #01 to #07, Chart #02 assigned the execution number [02] and Chart #07 assigned the execution number [07] are repeatedly executed ten times and five times, respectively. If a two-level input signal corresponding to "IN01" is in an ON-state after Chart #05 assigned the execution number [05] has been executed, the process proceeds to execution of Chart #07 assigned the execution number [07]. If the two-level input signal corresponding to "IN01" is in an OFF-state, the process returns to execution of Chart #01 assigned the execution number [01] after executing Chart #06 assigned the execution number [06]. The operation chart conversion tool creates a motion-and-sequence time chart in accordance with this execution order list.

Figure 12:
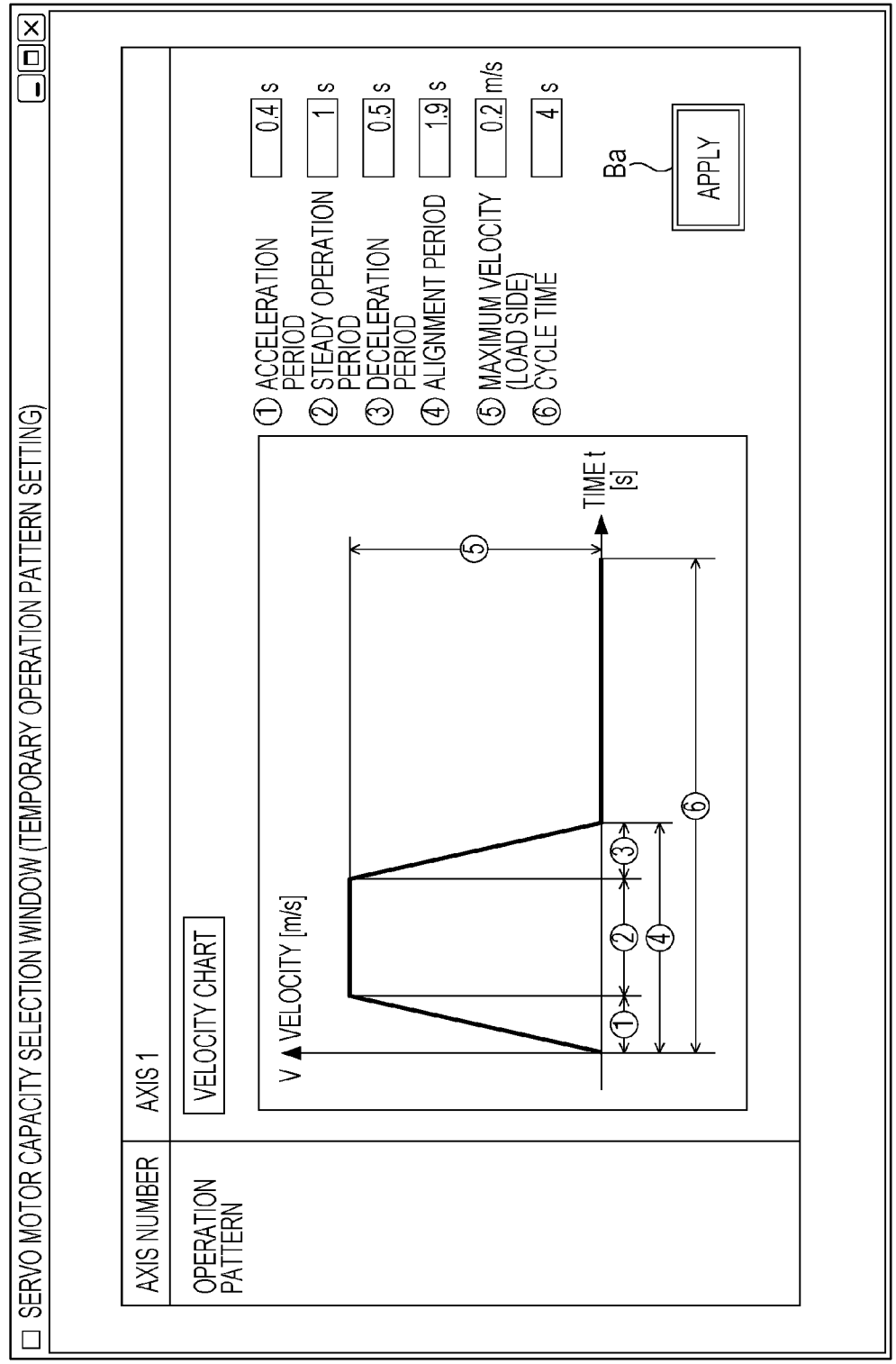
FIG. 12 is a diagram illustrating a display example of an edition window displayed when a motor capacity selection tool is executed.

The engineering tool according to this embodiment also includes an application used to select capacities of the motors 91 and 92. FIG. 12 is a diagram illustrating a display example of an edition window displayed when a motor capacity selection tool is executed. This motor capacity selection tool analyzes, for each component constituting a mechanism driven by the motor 91 or 92 subjected to selection, the moment of inertia (inertial mass) and the reduction ratio in advance. In the example illustrated in FIG. 12, an operation velocity pattern virtually executed by the motor 91 or 92 subjected to selection is chronologically illustrated. A motor capacity in the case where the aforementioned driven mechanism is operated in accordance with the illustrated operation velocity pattern is calculated in response to pressing of an "APPLY" button Ba provided at the bottom right in FIG. 12. A specific model of the motor 91 or 92 that satisfies the calculated motor capacity or the like is then selected from a database, and the result is displayed as the selection result. Note that, as the aforementioned operation velocity pattern, a preset fixed pattern or a pattern obtained by deforming a line into a given geometrical figure (or by inputting a parameter value) by the user on the window illustrated in FIG. 12 may be used. Alternatively, capacity selection using the illustrated operation pattern may be treated as rough selection, and ultimate capacity selection may be separately made using a servo velocity changing pattern described in accordance with the motion-and-sequence operation chart.

Figure 13:
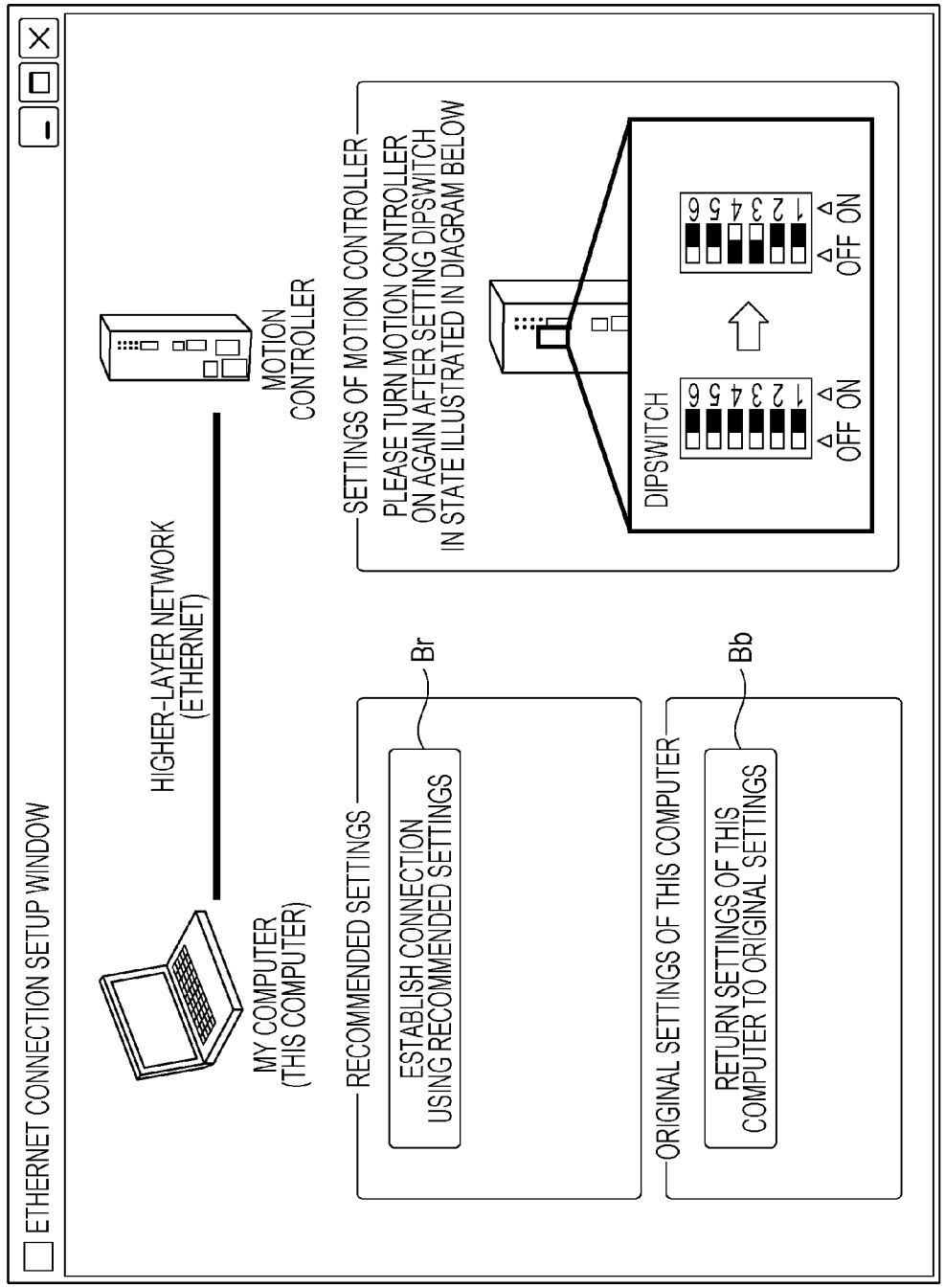
FIG. 13 is a diagram illustrating a display example of an operation window displayed when an Ethernet (registered trademark) connection setting tool is executed.

Moreover, the engineering tool according to this embodiment includes an application used to set network settings easily. FIG. 13 is a diagram illustrating a display example of an operation window displayed when an Ethernet (registered trademark) connection setup tool is executed. This Ethernet (registered trademark) connection setup tool in advance specifies a switch setting of a dipswitch included in the motion controller 5 to be connected. The user performs a setting operation after connecting the general-purpose PC 2 and the motion controller 5 whose dipswitch has been switched in accordance with the specification. In the illustrated example, a button Br used in the case of establishing a connection using recommended settings ("ESTABLISH CONNECTION USING RECOMMENDED SETTINGS" in FIG. 13) and a button Bb used in the case of returning the settings to the original settings are displayed on the window. When the user performs a selection operation for pressing the button Br for recommended settings, two private IP addresses based on the switching state of the dipswitch are automatically created and assigned to the general-purpose PC 2 and the motion controller 5. In this way, transmission and reception of data to and from each other are enabled over the higher-layer network ENW based on Ethernet (registered trademark) in this example. When the user performs a selection operation for pressing the button Bb for returning the settings to the original settings, the general-purpose PC 2 is re-configured to have a private IP address within a local area network (LAN) to which the general-purpose PC 2 is usually connected. In this way, re-connection to the original LAN is enabled. As described above, the use of the Ethernet (registered trademark) connection setup tool allows average mechanical engineers who do not have sufficient knowledge regarding the Ethernet (registered trademark)-based network to easily set network settings in the general-purpose PC 2 in this example.

In addition, the engineering tool according to this embodiment includes an application used to easily perform parameter setting and gain adjustment for the motor driving apparatuses 6 and the motor driving apparatus 7 (which are hereinafter collectively referred to as "motor driving apparatuses 6 and 7").

Figure 14B:
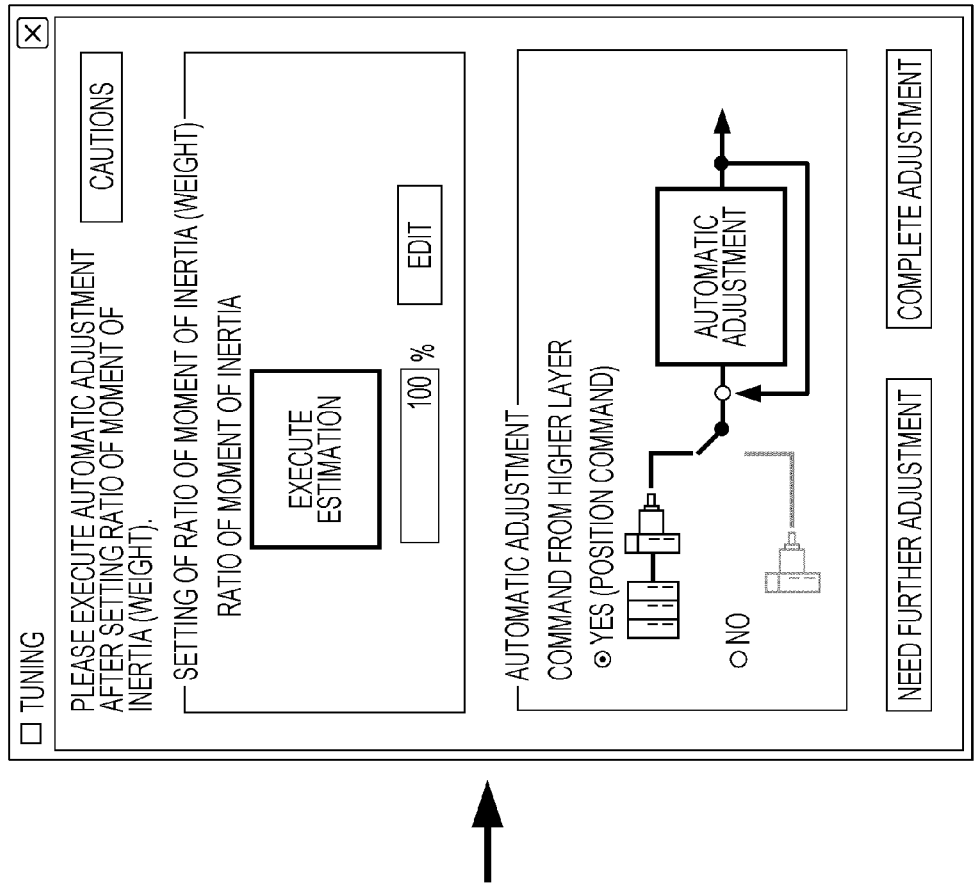
FIGS. 14A and 14B are diagrams each illustrating a display example of an adjustment window for a motor driving apparatus.
Figure 14A:
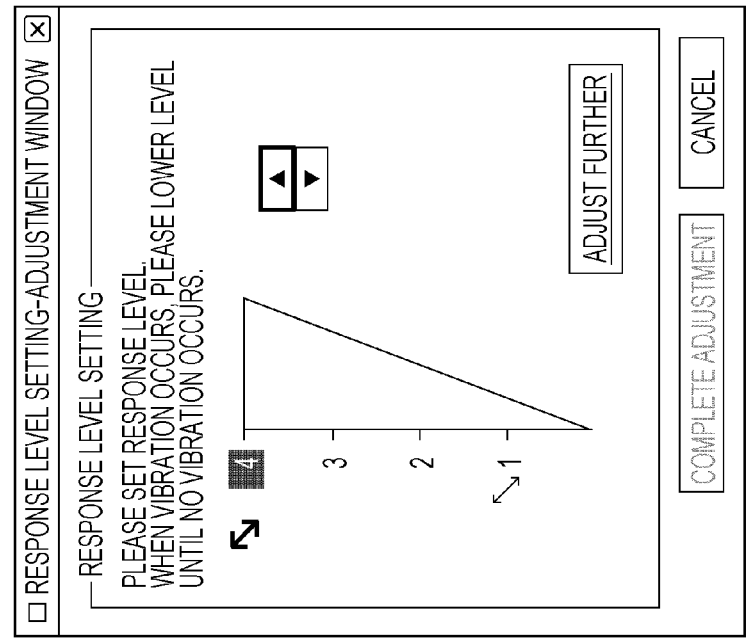

For example, FIGS. 14A and 14B illustrate an example of an adjustment window for the motor driving apparatus. For example, when the adjustment function is enabled, a window illustrated in FIG. 14A is initially displayed. On this window, the user can change a response level of the motor driving apparatus 6 or 7 by pressing up and down buttons. By making the value of the level higher, the user can set the response of the motor driving apparatus 6 or 7 faster. In the case where the user wishes to adjust the gain of the motor driving apparatus 6 or 7 in accordance with machinery, the user presses an "ADJUST FURTHER" button illustrated in FIG. 14A so as to change the window to the one illustrated in FIG. 14B. On the window illustrated in FIG. 14B, in response to pressing of a button for performing an operation for estimating the ratio of moment of inertia, the motor driving apparatus 6 or 7 performs the estimation operation and the parameter of the moment of inertia is automatically set in the motor driving apparatus 6 or 7. Subsequently, the user specifies whether a command to the motor driving apparatus 6 or 7 is an external command (YES at COMMAND FROM HIGHER LAYER) or an internal command (NO at COMMAND FROM HIGHER LAYER) using radio buttons. For example, in the case where the operation pattern of the motor driving apparatus 6 or 7 is not created from an operation chart, the user can select the internal command of the motor driving apparatus 6 or 7. In the case where the operation pattern of the motor driving apparatus 6 or 7 is prepared, the user can select the external command. In this way, the operation pattern is automatically loaded to the motor driving apparatus 6 or 7. The user then presses an "AUTOMATIC ADJUSTMENT" button, in response to which automatic adjustment of the gain of the motor driving apparatus 6 or 7 starts. After the automatic adjustment (auto tuning) operation has completed in the motor driving apparatus 6 or 7, internal parameters are automatically set in the motor driving apparatus 6 or 7.

Currently available products of the motor driving apparatus have a function that enables operation by auto tuning, instead of separately setting individual gains (such as a velocity gain, a positional gain, a ratio of moment of inertia) of the motor driving apparatus 6 or 7. In the case where the motion controller 5 and the motor driving apparatus 6 or 7 are connected to each other via the motion network MNW, data of the motor driving apparatus 6 or 7 can be loaded via the motion controller 5 to the general-purpose PC 2 connected to the motion controller 5. Therefore, the function of the motor driving apparatus 6 or 7 can be controlled on the window illustrated in FIG. 14A or 14B.

As described later, in the case where the motor driving apparatus 6 or 7 and the motion controller 5 are connected to each other using an analog signal, such as a velocity command or torque command, velocity control or position control is configured within the motion controller 5. Thus, by configuring the motion controller 5 to include the function of the motor driving apparatus 6 or 7 therein, operations equivalent to those described above can be performed.

In the case where servo adjustment or the like is performed by connecting the motor driving apparatus 6 or 7 and the motion controller 5 to each other using a pulse train and connecting the PC to a USB or serial I/F of the motor driving apparatus 6 or 7, the general-purpose PC 2 and the motor driving apparatus 6 or 7 are directly connected to each other and the motor driving apparatus 6 or 7 is directly recognized by the engineering tool included in the general-purpose PC 2.

In this way, the adjustment operation described in FIGS. 14A and 14B above can be implemented in the similar manner.

Figure 15:
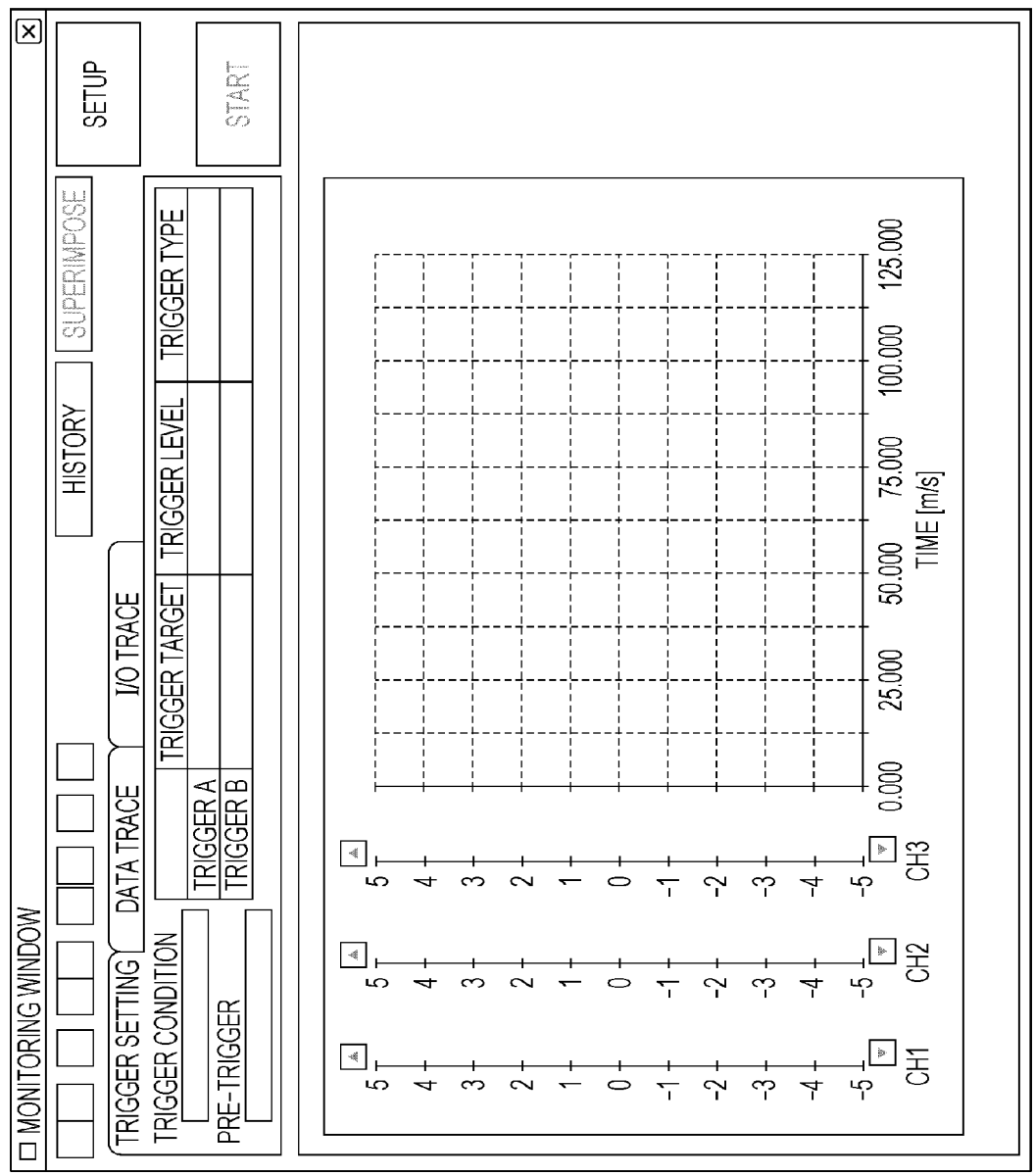
FIG. 15 is a diagram illustrating a display example of an operation state monitoring window for the motor driving apparatus.

Moreover, a monitoring function of the motor driving apparatus 6 or 7 for monitoring the operation state of the motor driving apparatus 6 or 7 can be easily displayed by defining appropriate buttons and changing the display window to the one illustrated in FIG. 15. Likewise, as for other parameters to be set in the motor driving apparatus 6 or 7, a setting operation can be easily implemented by creating a similar setting window and changing the display window using an appropriate button.

In the related art, individual adjustment manuals for the motor driving apparatuses 6 and 7 are thoroughly read for adjustment and a servo-exclusive engineering tool is used. In contrast, in accordance with the present disclosure, setting and adjustment of the motor driving apparatuses 6 and 7 can be performed just by starting an engineering tool for the motion controller 5 which is installed into the general-purpose PC 2 illustrated in FIG. 1. Also, a window that allows an intuitive operation is separately created as described above. This window advantageously allow mechanical engineers to perform adjustment and setting by themselves.

In the embodiment described above, the general-purpose PC 2 corresponds to a certain setting device recited in the claims, the motion-and-sequence time chart corresponds to a motion time chart and a sequence time chart recited in the claims, the motors 91 and 92 included in the mechanical section 9 of the production machinery 1 each correspond to a motor recited in the claims, a control process that causes the CPU 51 of the motion controller 5 to output a position data sequence of the motion-and-sequence time chart corresponds to a controller recited in the claims, the alignment command corresponds to a motor driving command recited in the claims, the higher-layer network ENW corresponds to a first communication configuration recited in the claims, the motion network MNW corresponds to a second communication configuration recited in the claims, and a position data sequence corresponds to a command data sequence recited in the claims.

As described above, the motion controller 5 included in the motor control system S according to this embodiment becomes able to perform motion control on the motors 91 and 92 by using the alignment function of the motor driving apparatuses 6 and 7 by outputting the position data sequence corresponding to the alignment command to the motor driving apparatuses 6 and 7 in accordance with the motion-and-sequence time chart that has been downloaded from the general-purpose PC 2 in advance. Therefore, unlike the configuration of the comparative example according to the related art in which the motion program in a form of intermediate language data is translated, the motion controller 5 according to this embodiment can perform motion control using the motion-and-sequence time chart which is relatively simple, and thus people not having the programming technique can make settings of motion control. As a result, average mechanical engineers become able to perform motion-control-related work from design to adjustment by themselves.

A processing load of the CPU 51 is reduced by a large amount, compared with the case where the motion program and the sequence ladder program which are of different types are interpreted and processed from their intermediate language data forms as in the comparative example according to the related art. As a result, the motion controller 5 can be formed using the CPU 51 which is relatively simple, and thus the cost of the motion controller 5 can be reduced.

Also, in accordance with this embodiment, the motion-and-sequence time chart is created by adding a command data sequence to an alignment command that uses an alignment function of the motor driving apparatus 6 or 7. Accordingly, the motion controller 5 can cause each motor driving apparatus 6 or 7 to keep performing a certain motion operation by just repeatedly outputting (for example, using a pulse train) the position data sequence to the motor driving apparatus 6 or 7.

Note that, depending on the specifications of the motion controller 5 and the motor driving apparatuses 6 and 7, there is a case where alignment control (or alignment control and velocity control) is performed by the motion controller 5 and only velocity control (or torque control) is performed by the motor driving apparatuses 6 and 7, for example. In such a case, the motion controller 5 may output a command to the motor driving apparatuses 6 and 7 using an analog signal. By configuring the motion-and-sequence time chart so as to include a data sequence corresponding to the command in accordance with such specifications, the motion controller 5 can cause the motor driving apparatuses 6 and 7 to keep performing a certain motion operation.

Also, in accordance with this embodiment, the motion-and-sequence time chart includes the sequence time chart which describes a coordinated relationship between motion control of the motor 91 or 92 and a certain two-level input/output signal relating to the motion control of the motor 91 or 92. Accordingly, the motion controller 5 becomes able to perform sequence control in coordination with each two-level input/output device connected to the remote I/O 8.

Also, in accordance with this embodiment, the motor control system S includes the motion controller 5, the motor driving apparatuses 6 and 7 each configured to output a driving power by means of its alignment function in accordance with the alignment command output from the motion controller 5, and the motors 91 and 92 each subjected to driving control based on the driving power output from the respective motor driving apparatuses 6 and 7. This configuration enables motion control using the motion controller 5, and thus average mechanical engineers become able to perform motion-control-related work from design to adjustment by themselves.

In the embodiment described above, the description has been given of a so-called multi-CPU configuration in which the PLC 3 and the motion controller 5 are independently configured as separate devices; however, the present disclosure is not limited to this configuration. Although not particularly illustrated in the drawings, the present disclosure is applicable to configurations such as a motion-slave type in which the motion controller 5 is managed by the PLC 3 and a PLC-built-in type in which the motion controller 5 is built in the PLC 3. Even in such cases, the similar benefits can be obtained.

In the embodiment described above, the term "motion control" refers to control causing a motor to perform a quantitative operation; however, the present disclosure is not limited to such control. In addition to this control, controlling the operation of a solenoid-valve-controlled pneumatic (hydraulic) cylinder (not particularly illustrated) that functions as an actuator just like the motor is also covered by the broad meaning of motion control, and similar benefits are obtained when the present disclosure is applied to such a case. A pneumatic cylinder is generally operated as a result of two-level control based on ON and OFF of a solenoid valve. In this case, the motion controller 5 can perform motion control on the pneumatic cylinder by referring to the motion-and-sequence time chart created based on an operation chart which is illustrated in FIG. 9 and in which motion control of the pneumatic cylinder is set and input as two-level output signals.

For example, referring to FIG. 1, a two-level output signal is output from the motion controller 5 to the remote I/O 8 via the motion network MNW without using the motor driving apparatuses 6 and 7, or the motion controller 5 receives a two-level input signal from the remote I/O 8. The remote I/O 8 is connected by wire to a lamp, solenoid, sensor, or switch provided in the mechanical section 9. For example, in the case of a mechanism for moving a workpiece using an air cylinder that operates due to air pressure, air that drives the air cylinder can be switched between ON and OFF by a solenoid valve for switching air. A solenoid included in the solenoid valve is wired with the remote I/O 8. The remote I/O 8 drives the solenoid valve. In this way, operation of the air cylinder can be controlled.

As in the embodiment described above, for example, in the case where SOLENOID #01 is assigned to the air cylinder via the remote I/O 8 in the chart of the two-level output signal in the operation chart illustrated in FIG. 9, if the signal level changes from low to high in FIG. 9, the solenoid valve operates to send compressed air to the air cylinder, causing the air cylinder to operate. For example, in the case where a direct-acting air cylinder operates (expands), a detection signal of a sensor configured to detect a moving end is assigned to SENSOR #02 via the remote I/O 8. Also, the state is set (a solenoid trigger condition is set) in the operation chart so that the signal of SOLENOID #01 changes from high to low in response to a change in the signal of SENSOR #02. When SENSOR #02 detects operation of the air cylinder and the signal of SENSOR #02 changes from low to high, the signal of SOLENOID #01 changes from high to low, causing the solenoid valve to operate and block compressed air, and consequently causing the operation of the air cylinder to stop. In this way, a rod of the air cylinder can be aligned to a predetermined position in accordance with the position where SENSOR #02 is installed. Similarly, by connecting SOLENOID #02 to another solenoid valve and configuring an air circuit so as to cause the air cylinder to move in the opposite direction, the air cylinder can be returned to the original position as in the case of the above-described operation.

As described above, by using the operation chart as in the case of driving motors, the air cylinder can be driven without using the ladder program. In the related art, the air cylinder is operated after an operation sequence is set in the PLC 3 or the motion controller 5 by writing a ladder program. For this reason, it is difficult to perform a test operation or debugging of operation of the machinery only by mechanical engineers as in the above-described case of motion control for motors. However, the present disclosure makes it possible to operate the air cylinder only by mechanical engineers.

Other than the methods described above, methods according to the embodiment and modifications may be appropriately used in combination.

Although not illustrated separately, various alterations may be added and carried out within a range not departing from the gist.

It should be understood by those skilled in the art that various modifications, combinations, sub-combinations and alterations may occur depending on design requirements and other factors insofar as they are within the scope of the appended claims or the equivalents thereof.

What is claimed is:

1. A motion controller comprising:
   a controller configured to output a motor driving command based on a motion time chart used for motion control of a motor, to a motor driving apparatus; and
   a memory configured to store the motion time chart, the motion time chart being created by a setting device based on a sequence time chart that includes chronologically modifiable parameters.

2. The motion controller according to claim 1, wherein the controller is configured to receive the motion time chart from the setting device via a first communication configuration.

3. The motion controller according to claim 1, wherein the controller is configured to receive the motion time chart including a command data sequence included in the motor driving command for the motor driving apparatus.

4. The motion controller according to claim 1, wherein the controller is configured to receive the motion time chart including the sequence time chart that describes a coordinated relationship between the motion control of the motor and a certain two-level input/output signal relating to the motion control of the motor.

5. The motion controller according to claim 1, wherein the controller is configured to output the motor driving command to the motor driving apparatus via a second communication configuration.

6. A motor control system comprising:
   ion controller according to claim 1;
   at least one motor; and
   a motor driving apparatus configured to supply the motor with a driving power in accordance with the motor driving command based on the motion time chart used for motion control of the motor.

7. The motor control system according to claim 6, further comprising:
   the setting device wherein
   the setting device includes a function that allows a user to perform, through a selection operation and a geometrical figure input operation, various setting operations for the motor driving apparatus, the setting operations relating to the motion control of the motor, and is configured to create the motion time chart using the function.

8. The motor control system according to claim 7, wherein the setting apparatus includes a function for driving the motor in real time via the motion controller and the motor driving apparatus, in response to a selection operation from a user.

9. The motor control system according to claim 7, wherein the setting device includes a function for switching a communication configuration for communication between the setting device and the motion controller, in response to a selection operation from a user.

10. The motor control system according to claim 7, further comprising:
    an input/output device configured to receive or output a certain two-level output signal based on a certain operation caused by a two-level input signal or based on a certain operation, wherein
    the setting device includes a function for virtually setting, in response to a selection operation from a user, in place of the input/output device, a destination to which or from which a certain two-level input/output signal relating to the motion control of the motor is to be input or output.

11. The motion controller according to claim 1, wherein the controller is configured to download the motion time chart from the setting device.

12. The motion controller according to claim 1, wherein the motion controller is configured to output the motor driving command based on the motion time chart, the motion time chart being created by the setting device without translating the sequence time chart to intermediate language data.

13. The motor control system according to claim 1, wherein the sequence time chart includes chronologically modifiable parameters of a plurality of motors, including the motor, in a common time axis so as to provide a coordinated relationship between the plurality of motors.

14. A motor control system comprising:
   a setting device configured to create a motion time chart based on a sequence time chart that includes chronologically modifiable parameters;
   at least one motor;
   a motion controller having:
      a controller configured to output a motor driving command based on the motion time chart used for motion control of the motor, to a motor driving apparatus; and
      a memory; and
   the motor driving apparatus configured to supply the motor with a driving power in accordance with the motor driving command based on the motion time chart used for motion control of the motor,
   wherein the memory is configured to store the motion time chart.

15. The motor control system according to claim 14, wherein the controller is configured to download the motion time chart from the setting device.

16. The motor control system according to claim 14, wherein the setting device is configured to create the motion time chart without translating the sequence time chart to intermediate language data.

17. The motor control system according to claim 14, further comprising a plurality of motors, including the motor,
   wherein the sequence time chart includes chronologically modifiable parameters of the plurality of motors in a common time axis so as to provide a coordinated relationship between the plurality of motors.

* * * * *